(12) United States Patent
Lee et al.

(10) Patent No.: US 9,796,632 B2
(45) Date of Patent: Oct. 24, 2017

(54) METHOD FOR MANUFACTURING CERAMIC FILTER

(71) Applicant: KOREA INSTITUTE OF INDUSTRIAL TECHNOLOGY, Cheonan-si, Chungcheongnam-do (KR)

(72) Inventors: Myong Hwa Lee, Gyeonggi-do (KR); Hyun Jin Choi, Incheon (KR); Jeong Uk Kim, Daejeon (KR)

(73) Assignee: KOREA INSTITUTE OF INDUSTRIAL TECHNOLOGY, Cheonan-si, Chungcheongnam-do (KR)

( * ) Notice: Subject to any disclaimer, the term of this patent is extended or adjusted under 35 U.S.C. 154(b) by 129 days.

(21) Appl. No.: 14/729,757

(22) Filed: Jun. 3, 2015

(65) Prior Publication Data

US 2015/0266780 A1    Sep. 24, 2015

Related U.S. Application Data

(63) Continuation-in-part of application No. 14/646,494, filed as application No. PCT/KR2013/010620 on Nov. 21, 2013, now abandoned.

(30) Foreign Application Priority Data

Nov. 21, 2012  (KR) ........................ 10-2012-0132608

(51) Int. Cl.
*C04B 38/00* (2006.01)
*B28B 1/32* (2006.01)
(Continued)

(52) U.S. Cl.
CPC .......... *C04B 35/565* (2013.01); *C04B 35/622* (2013.01); *C04B 38/066* (2013.01);
(Continued)

(58) Field of Classification Search
CPC .... B28B 1/29; B28B 1/30; B28B 1/32; C04B 38/0006; C04B 38/0009; C04B 38/0012; C04B 38/0016; C04B 38/0019
(Continued)

(56) References Cited

U.S. PATENT DOCUMENTS 4,528,099 A * 7/1985 Rieger ............... B01D 39/2075
                                                        210/489
4,806,206 A    2/1989 Kamijo et al.
(Continued)

FOREIGN PATENT DOCUMENTS

JP        S59190250        10/1984
JP        S6033250         2/1985
(Continued)

OTHER PUBLICATIONS

Japanese Office Action for Japanese Application No. 2015-543983, Completed by the Japanese Patent Office, dated Apr. 5, 2016, 3 Pages.
(Continued)

*Primary Examiner* — Erin Snelting
(74) *Attorney, Agent, or Firm* — Brooks Kushman P.C.

(57) ABSTRACT

A method of manufacturing a ceramic filter for hot gas filtration, and, more particularly, to a method of manufacturing a ceramic filter for hot gas filtration through a drying process. The ceramic filter manufactured by the method is advantageous in that the pore size thereof can be easily adjusted, and the filtering area thereof can be maximized, thus improving the performance thereof. Consequently, the method of manufacturing a ceramic filter can be usefully used in the filter-related industry because a high-performance ceramic filter can be manufactured at a low cost and at low energy.

15 Claims, 3 Drawing Sheets

(51) Int. Cl.
*C04B 35/565* (2006.01)
*C04B 35/622* (2006.01)
*C04B 38/06* (2006.01)
*C04B 111/00* (2006.01)

(52) U.S. Cl.
CPC ............... *C04B 2111/00793* (2013.01); *C04B 2235/3208* (2013.01); *C04B 2235/3244* (2013.01); *C04B 2235/3463* (2013.01); *C04B 2235/5436* (2013.01); *C04B 2235/616* (2013.01); *C04B 2235/6562* (2013.01); *C04B 2235/6567* (2013.01); *C04B 2235/94* (2013.01)

(58) Field of Classification Search
USPC .................................................. 264/630, 631
See application file for complete search history.

(56) References Cited

U.S. PATENT DOCUMENTS

| | | | | |
|---|---|---|---|---|
| 4,824,711 | A * | 4/1989 | Cagliostro | C04B 35/83 156/89.22 |
| 5,558,760 | A * | 9/1996 | Sekhar | B22F 3/114 210/106 |
| 8,147,634 | B2 * | 4/2012 | Sakakibara | B01D 46/0063 156/89.22 |
| 8,495,968 | B2 | 7/2013 | Tsuji et al. | |
| 8,534,221 | B2 | 9/2013 | Tsuji et al. | |
| 8,936,830 | B2 * | 1/2015 | Kim | B05D 1/12 427/190 |
| 8,951,624 | B2 * | 2/2015 | Sakakibara | B01D 46/0063 422/180 |
| 9,117,736 | B2 * | 8/2015 | Kub | H01L 29/1602 |
| 2002/0178707 | A1 | 12/2002 | Vance et al. | |
| 2003/0029142 | A1 | 2/2003 | Noda et al. | |
| 2004/0176246 | A1 | 9/2004 | Shirk et al. | |
| 2008/0096751 | A1 | 4/2008 | Isomura et al. | |
| 2008/0241444 | A1 * | 10/2008 | Oshimi | B01D 46/2418 428/34.1 |
| 2008/0318001 | A1 * | 12/2008 | Sakakibara | B01D 46/0063 428/116 |
| 2010/0126133 | A1 * | 5/2010 | Fekety | F01N 3/035 55/523 |
| 2010/0203284 | A1 * | 8/2010 | Kanai | C04B 28/24 428/116 |
| 2011/0236627 | A1 * | 9/2011 | Kanai | B01D 46/2466 428/116 |
| 2012/0148793 | A1 * | 6/2012 | Sakakibara | B01D 46/0063 428/116 |
| 2012/0186211 | A1 | 7/2012 | Kudo et al. | |
| 2013/0149471 | A1 * | 6/2013 | Kim | B05D 1/12 427/600 |
| 2013/0306989 | A1 * | 11/2013 | Kub | H01L 29/1602 257/77 |
| 2016/0038915 | A1 * | 2/2016 | Addiego | B01J 20/28045 502/415 |

FOREIGN PATENT DOCUMENTS

| | | |
|---|---|---|
| JP | S62149317 | 7/1987 |
| JP | 06327921 | 11/1994 |
| JP | H07213836 | 8/1995 |
| JP | H0948679 | 2/1997 |
| JP | H10249124 | 9/1998 |
| JP | H10263340 | 10/1998 |
| JP | 2006513856 | 4/2006 |
| JP | 2010506699 | 3/2010 |
| JP | 2012157855 | 8/2012 |
| KR | 1020060089278 | 8/2006 |
| KR | 100690573 | 3/2007 |
| KR | 10201 10048991 | 5/2011 |
| WO | 2004050214 | 6/2004 |

OTHER PUBLICATIONS

International Search Report for PCT/KR2013/010620, English translation attached to original, Both completed by the Korean Patent Office dated Mar. 7, 2014, All together 7 Pages.

Korean Office Action for Korean Application No. 10-2013-0142403, Completed by the Korean Patent Office, dated Jun. 28, 2015, 5 Pages.

Korean Office Action for Korean Application No. 10-2013-0142403, Completed by the Korean Patent Office, dated Nov. 27, 2015, 4 Pages.

* cited by examiner

METHOD FOR MANUFACTURING CERAMIC FILTER

CROSS-REFERENCE TO RELATED APPLICATION

This application is a Continuation-in-Part of Ser. No. 14/646,494 filed May 21, 2015 which is the U.S. national phase of PCT Application No. PCT/KR2013/010620 filed on Nov. 21, 2013, which claims priority to KR Patent Application No. 10-2012-0132608 filed on Nov. 21, 2012, the disclosures of which are incorporated in their entirety by reference herein.

TECHNICAL FIELD

The present invention relates to a method of manufacturing a ceramic filter for hot gas filtration, and, more particularly, to a method of manufacturing a ceramic filter for hot gas filtration through a drying process.

BACKGROUND

With the development of industries, damages due to particulate and gaseous contaminants discharged from industrial processes are becoming more serious. Therefore, in order to prevent the discharge of particulate contaminants contained in exhaust gas, filters have been generally used. However, among these filters, polymer filters have drawbacks in heat resistance, chemical resistance, wear resistance, and flame resistance. For example, polyester filters have a problem that they undergo contraction at 150° C., and PTFE (Teflon) filters having excellent heat resistance also have a problem that they cannot tolerate a temperature of 300° C. or higher. Further, a process using an industrial filter has a problem that a large amount of particulate contaminants having strong wear properties are discharged, and these discharged particulate contaminants damage the surface of the filter material, such as polyester, polypropylene, acryl, polyamide, polyimide, glass fiber or the like, thus reducing the lifetime of the filter. In addition, there are also problems that fires may occur due to the generation of flames during a combustion process, or the filtering effect of exhaust gas is reduced due to the holes generated in the filter.

Accordingly, in order to solve such problems, ceramic filters have been developed. Ceramic filters are characterized in that they have very excellent heat resistance, chemical resistance and wear resistance compared to polymer filters, and are advantageous in that they have excellent heat resistance, not necessitating a cooling apparatus or the like to be additionally installed in an exhaust system, thus reducing installation and maintenance costs.

In the case of existing ceramic filters, generally, they are manufactured by a method including making a composition into slurry; and vacuum-forming or extrusion-forming the slurry into a tube. However, this method is disadvantageous in that it is difficult to freely control filtration efficiency and pressure loss, in that the manufacturing cost of the ceramic filter is high, and in that, when the ceramic filter is used for a long period of time, dusts accumulate in the ceramic filter, thus reducing filtration performance. Further, they have a problem that, when dust is shaken off from the outer wall of the ceramic filter by reversely injecting compressed air at the time of regeneration of the ceramic filter, the ceramic filter is damaged, and, at the time of normal operation using this damaged ceramic filter, dusts are included in exhaust gas and then discharged, thereby causing a secondary pollution. In addition, there is a problem that, since the ceramic filter is configured to have uniform porosity in the width direction thereof (inner and outer walls), a clogging phenomenon occurs when dusts are collected in the ceramic filter, thus increasing pressure loss.

Further, in terms of a manufacturing process, a vacuum process is problematic in that it takes a high cost to fabricate a vacuum chamber and a vacuum pump, and the size of a manufacturable ceramic filter is restricted depending on the restriction of size of a vacuum chamber, and thus a large-size ceramic filter cannot be manufactured, and in that a ceramic material is seriously worn, and thus a mold must be replaced with respect to each predetermined production amount, thereby increasing a production cost.

Meanwhile, in addition to the vacuum forming, extrusion forming, press forming, hydrostatic pressure forming, etc., have been developed. However, even in this case, there is a problem in that a mold must be fabricated and a pressure device must be provided, so a manufacturing cost increases, a manufacturing process is not easy, the change of a manufacturing shape is not easy when the mold is determined, and the production of a large-size filter is difficult. Further, in the case of the above forming methods, there is a problem in that, since theses forming methods are a pressure forming method, air permeability is lowered due to low porosity, and pressure loss increases at the time of passing through a filter.

Thus, the present inventors, while endeavoring to find a method of manufacturing a ceramic filter for hot gas filtration capable of easily adjusting a pore size and being manufactured at low cost and low energy, discovered that a ceramic filter for hot gas filtration, manufactured by aerosolizing a ceramic composition powder through a drying process instead of a wet process, exhibits excellent filter characteristics, and can overcome the above problems, thereby completing the present invention.

SUMMARY

An objective of the present invention is to provide a manufacturing method of a ceramic filter for hot gas filtration through a drying process, by which a ceramic filter capable of easily adjusting a pore size can be manufactured at low cost and low energy.

Technical Solution

In order to accomplish the above objective, the present invention provides a method of manufacturing a ceramic filter, including:

filtering a carrier gas including a ceramic-forming composition in the form of powder on the surface of the polymer filter body having pores of a first size, the ceramic-forming composition containing ceramic precursor particles of a second size and an inorganic and/or organic binder, to form a ceramic-forming composition layer on the surface of the polymer filter body (step 1); and sintering the resultant in step 1, to form a ceramic filter having a pore size defined the third size of ceramic particle corresponding to the ceramic precursor particles of the second size, while burning out the polymer filter body (step 2).

In step 1, in order to uniformly apply a ceramic-forming composition to the surface of a polymer filter body, a carrier gas including the ceramic-forming composition in the form of powder, the ceramic-forming composition containing ceramic precursor particles of the second size and inorganic and/or organic binder, is filtered by the polymer filter body having pores of the first size.

As used herein, the term "ceramic-forming composition" refers to a composition capable of forming ceramic. In the present invention, the ceramic-forming composition is in the form of powder, thereby capable of accumulating by the carrier gas. Specifically, the ceramic-forming composition in the form of powder means a powered composition which is accumulated on the polymer filter body to a predetermined thickness and then sintered to form ceramic.

As used herein, the term "carrier gas" refers to a gas capable of carrying the ceramic-forming composition in the form of powder. In the present invention, the carrier gas is preferably reactive or non-reactive to the ceramic precursor particles and the inorganic and/or organic binder in the ceramic-forming composition. Examples of the carrier gas may include air, $N_2$ gas, etc., but are not limited thereto.

In one embodiment of the present invention, step 1 is repeated at least 2 times using the ceramic precursor particles of the same size, thereby capable of controlling the pore size of the ceramic filter.

In one embodiment of the present invention, step 1 is repeated at least 2 times by varying the size of ceramic precursor particles and/or the material of ceramic precursor particles, thereby capable of controlling the pore size of the ceramic filter.

In one embodiment of the present invention, step 1 includes a former step and a latter step, and the ceramic-forming composition containing various particle sizes and/or various materials of ceramic precursor particles may be used with respect to each step. Preferably, in the former step, a ceramic-forming composition containing ceramic precursor particles having a size of about 100 μm is used, and, in the latter step, a ceramic-forming composition containing ceramic precursor particles having a size of about 5 μm is used. As described above, when a ceramic-forming composition containing ceramic precursor particles having a large particle size is used in the former step, a ceramic-forming composition layer can be rapidly formed in the former step. In contrast, when a ceramic-forming composition containing ceramic precursor particles having a small particle size is used in the latter step, the thickness of the ceramic-forming composition layer can be easily adjusted in the latter step. Moreover, as described above, when a ceramic-forming composition containing ceramic precursor particles having a large particle size is used in the former step, fine particles are filtered at high efficiency on the surface of the ceramic filter, and, at the time of dust removal, dust removal efficiency increases due to the inner large pores and outer small pores of the ceramic filter.

In the present invention, the ceramic precursor particle is silicon carbide (SiC).

In the present invention, the inorganic and/or organic binder is mullite ($3Al_2O_3 \cdot SiO_2$), zirconia ($ZrO_2$), calcium carbonate ($CaCO_3$), carboxymethyl cellulose, or a combination thereof.

In an embodiment of the present invention, the ceramic-forming composition may contain silicon carbide (SiC), mullite ($3Al_2O_3 \cdot SiO_2$), zirconia ($ZrO_2$), calcium carbonate ($CaCO_3$), and carboxymethyl cellulose.

The ceramic-forming composition may further contain water. When the ceramic-forming composition further contains water, there is an advantage in that the ceramic-forming composition can more easily adhere to the surface of the polymer filter body, and thus it is easier to form a ceramic-forming composition layer.

In the present invention, the content of the silicon carbide is preferably 70 to 75 parts by weight, more preferably 73 to 74 parts by weight, and most preferably 73.8 parts by weight, based on 100 parts by weight of the entire ceramic-forming composition. When the silicon carbide content exceeds the upper limit, a ceramic layer may be cracked due to the deficiency of a binder, and when the content thereof is less than the lower limit, mechanical strength and heat resistance may be deteriorated due to the deficiency of silicon carbide.

In the present invention, the pore size of a ceramic filter can be adjusted depending on the size of ceramic precursor particles of the second size, and thus the filtration efficiency of particulate contaminants in exhaust gas can be adjusted.

In the present invention, the size of ceramic precursor particles of the second size is preferably in the range of from 5 μm to 100 μm, more preferably from 10 μm to 50 μm, and most preferably 25 μm. When the size of ceramic precursor particles of the second size is less than 5 μm, pores become excessively dense, and thus pores may be clogged due to contaminants. In contrast, when the size of ceramic precursor particles of the second size is greater than 100 μm, pore size becomes excessively large, and the filtration efficiency of fine contaminants may be decreased.

Specifically, in an embodiment of the present invention, ceramic filters were manufactured using silicon carbide having a particle size of 10 μm, silicon carbide having a particle size of 25 μm and silicon carbide having a particle size of 50 μm, respectively, and filtration efficiencies thereof were measured. As a result, it was found that fine contaminants of 1 μm or less could be filtered at a rate of 90% or higher when silicon carbide having a particle size of from 10 μm to 50 μm was used.

In the present invention, the ceramic-forming composition may contain mullite as an inorganic binder.

In the present invention, the content of the mullite is preferably 3 to 4 parts by weight, more preferably 3.5 to 3.8 parts by weight, and most preferably 3.7 parts by weight, based on 100 parts by weight of the entire ceramic-forming composition. When the content of the mullite is more than the upper limit, mechanical strength and heat resistance may be deteriorated due to the deficiency of silicon carbide, and when the content thereof is less than the lower limit, cracks may occur due to the deficiency of a binder.

In the present invention, the ceramic-forming composition may contain zirconia as an inorganic binder.

In the present invention, the content of the zirconia is preferably 3 to 4 parts by weight, more preferably 3.5 to 3.8 parts by weight, and most preferably 3.7 parts by weight, based on 100 parts by weight of the entire ceramic-forming composition. When the content of the zirconia is more than the upper limit, mechanical strength and heat resistance may be deteriorated due to the deficiency of silicon carbide, and when the content thereof is less than the lower limit, cracks may occur due to the deficiency of a binder.

In the present invention, the ceramic-forming composition may contain calcium carbonate as an inorganic binder.

In the present invention, the content of the calcium carbonate is preferably 0.5 to 1.0 parts by weight, more preferably 0.7 to 0.9 parts by weight, and most preferably 0.8 parts by weight, based on 100 parts by weight of the entire ceramic-forming composition. When the calcium carbonate content exceeds the upper limit, mechanical strength and heat resistance may be deteriorated due to the deficiency of silicon carbide, and when the content thereof is less than the lower limit, cracks may occur due to the deficiency of a binder.

In the present invention, the ceramic-forming composition may contain carboxymethyl cellulose (CMC) as an organic binder.

In the present invention, the content of the carboxymethyl cellulose is preferably 1 to 2 parts by weight, more preferably 1.5 to 1.7 parts by weight, and most preferably 1.6 parts by weight, based on 100 parts by weight of the entire ceramic-forming composition. When the carboxymethyl cellulose content exceeds the upper limit, mechanical strength and heat resistance may be deteriorated due to the deficiency of silicon carbide, and when the content thereof is less than the lower limit, cracks may occur due to the deficiency of a binder.

In the present invention, the ceramic-forming composition may further contain water in order to increase the adhesiveness thereof to the polymer filter body, as described above.

In the present invention, the content of the water is preferably 10 to 20 parts by weight, more preferably 15 to 17 parts by weight, and most preferably 16.4 parts by weight, based on 100 parts by weight of the entire ceramic-forming composition. When the water content exceeds the upper limit, it is difficult to perform a drying process, and when the content thereof is less than the lower limit, the adhesiveness of the powder may be lowered.

According to a preferred embodiment of the present invention, the ceramic-forming composition may contain silicon carbide, mullite, zirconia, calcium carbonate, carboxymethyl cellulose, and water at a weight ratio of 70~75: 3~4:3~4:0.5~1.0:1~2:10~20. Most preferably, the ceramic-forming composition may contain silicon carbide, mullite, zirconia, calcium carbonate, carboxymethyl cellulose, and water at a weight ratio of 73.8:3.7:3.7:0.8:1.6:16.4. When the ceramic-forming composition having such a weight ratio is used, it is possible to manufacture a ceramic filter having excellent mechanical strength and heat resistance and having no crack.

As used herein, the term "polymer filter body" refers to a filter body made of a polymer material. As the polymer filter body, a commercially-available polymer filter body or a polymer filter body directly fabricated by a conventional method may be used.

In the present invention, the size of pores of the first size in the polymer filter body is preferably 5 μm or less, and more preferably 1 μm to 5 μm. When the polymer filter body having such a pore size is used, in step 1) of filtering the carrier gas including the ceramic-forming composition using the polymer filter body, a ceramic-forming composition layer can be easily formed on the surface of the polymer filter body.

In the present invention, the polymer filter body may be made of polyester, polypropylene, acryl, polyamide, polyimide, or a glass fiber, but the material of the polymer filter body is not limited thereto.

In the present invention, the filtration may be performed at a rate of 0.5~10 m/min. When the filtration is performed within the above range, the efficiency of forming a ceramic-forming composition layer is high.

In the present invention, the ceramic-forming composition layer may have a thickness of from 1 mm to 10 mm. When the ceramic-forming composition layer has a thickness of 1 mm or higher, a ceramic layer obtained after sintering has excellent mechanical strength and heat resistance. In contrast, when the thickness thereof is 10 mm or less, a ceramic filter have an appropriate pore size, and thus the filtration efficiency of the ceramic filter is high.

The method of manufacturing a ceramic filter according to the present invention is advantageous in that the thickness of the ceramic-forming composition layer can be easily adjusted, and thus the pore size of a ceramic filter can be easily adjusted, so as to solve the problem of pressure loss occurring when passing through the ceramic filter.

In step 2), the resultant in step 1 is sintered to form a ceramic filter.

In the present invention, the sintering is performed preferably at from 1400° C. to 1500° C., and most preferably 1450° C.

In the present invention, it is preferred in terms of preventing the crack of ceramic that, during the sintering, the polymer filter body is gradually heated from room temperature to sintering temperature. In this case, it is preferred in terms of crack prevention that the heat treatment is performed by increasing temperature at a rate of from 3° C./min to 4° C./min, and preferably 3.3° C./min.

In the present invention, the sintering is performed for from 1 hour to 5 hours, more preferably from 1 hour to 3 hours, and most preferably 2 hours.

The method of manufacturing a ceramic filter according to the present invention is advantageous in that the pore size of the ceramic filter can be easily adjusted by adjusting the thickness of the ceramic-forming composition layer, the ceramic filter can be manufactured at a low cost and at low energy because a mold and a pressure device are not additionally required, the ceramic filter has various shapes depending on the shape and size of the polymer filter body used, and various sizes of small and large ceramic filters can be manufactured.

The present invention provides a ceramic filter manufactured by the above method.

The ceramic filter manufactured by the method is advantageous in that a ceramic layer is formed, and thus the ceramic filter has high heat resistance, chemical resistance and wear resistance due to the ceramic layer.

Advantageous Effects

Since the ceramic filter of the present invention does not employ a conventional pressure forming process, the pore size thereof can be easily adjusted, and thus the problem of pressure loss occurring when passing through the filter can be solved.

Further, since the method of manufacturing a ceramic filter of the present invention does not require additional process of fabricating a mold, a ceramic filter can be manufactured at a low cost and can be manufactured without using a mold, so that the shape of a filter is easily changed to maximize the filtering area according to use, thereby manufacturing a high-performance ceramic filter.

Consequently, the ceramic filter and manufacturing method thereof according to the present invention can be usefully used in the filter-related industry because a high-performance ceramic filter can be manufactured at a low cost and at low energy.

DETAILED DESCRIPTION

Hereinafter, the present invention will be described in more detail with reference to the following Examples. However, these Examples are set forth to illustrate the present invention, and the scope of the present invention is not limited thereto.

Examples 1 to 3: Manufacturing Ceramic Filter

Figure 1:
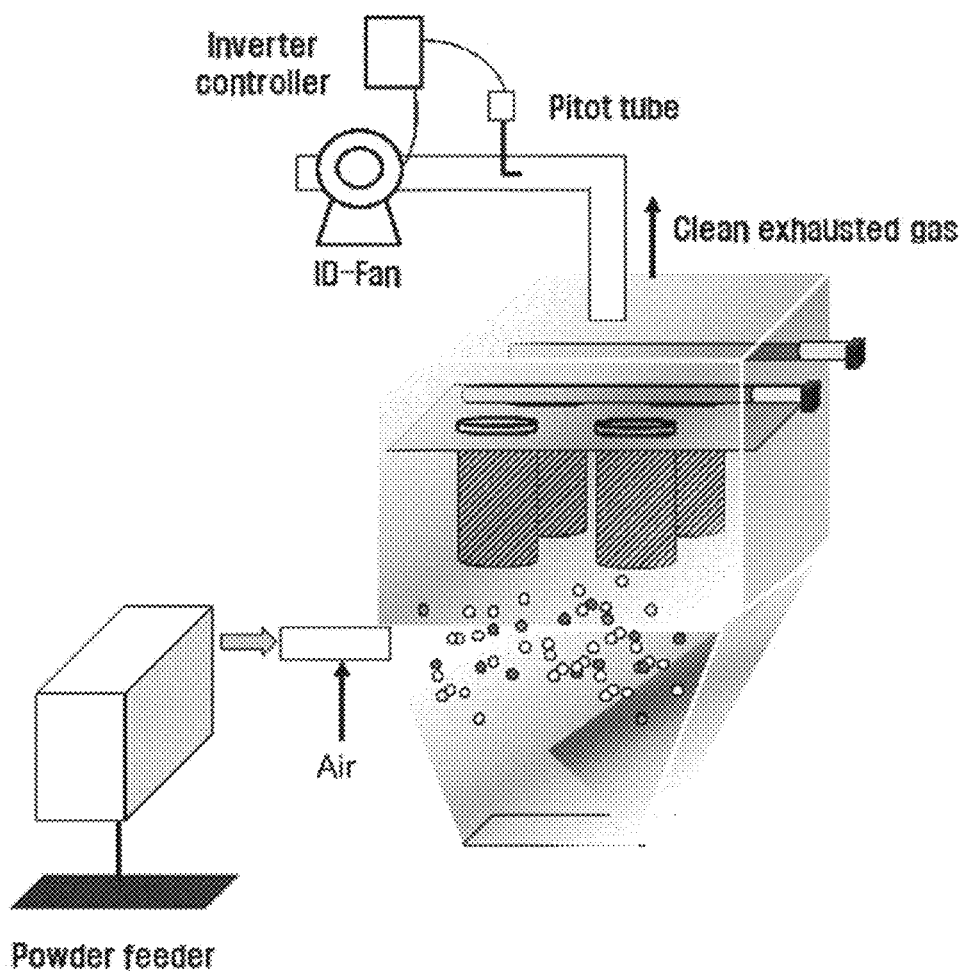
FIG. 1 is a schematic view showing a process of manufacturing a ceramic filter according to the present invention.

FIG. 1 schematically shows a process of manufacturing a ceramic filter.

Specifically, in order to manufacture ceramic filters for hot gas filtration, first, a ceramic composition powder containing silicon carbide, mullite, zirconia, calcium carbonate, carboxymethyl cellulose, and water at a weight ratio of 73.8:3.7:3.7:0.8:1.6:16.4 was injected to pass through a polymer filter body (average pore size: 3 μm, polyester, manufactured by Daesung Filter Tech. Co., Ltd.) together with air through a powder inlet. In this case, silicon carbide having a particle size of 10 μm (Example 1), silicon carbide having a particle size of 25 μm (Example 2), and silicon carbide having a particle size of 50 μm (Example 3) were respectively used. Further, the filtration of the ceramic composition powder was conducted at the rate of 5 m/min, and the thickness of a ceramic composition powder layer was adjusted to 5 mm.

Thereafter, the polymer filter body provided with the ceramic powder layer was sintered at 1450° C. for 2 hours, so as to manufacture a ceramic filter. During the sintering, a heating rate of 3.3° C./min was maintained from room temperature to sintering temperature.

Experimental Example 1: Examination of Structural Characteristics of Ceramic Filter In order to examine the structural characteristics of the ceramic filter manufactured in Example 2, the surface of the ceramic filter of the present invention was observed with a scanning electron microscope (SEM).

Figure 2:
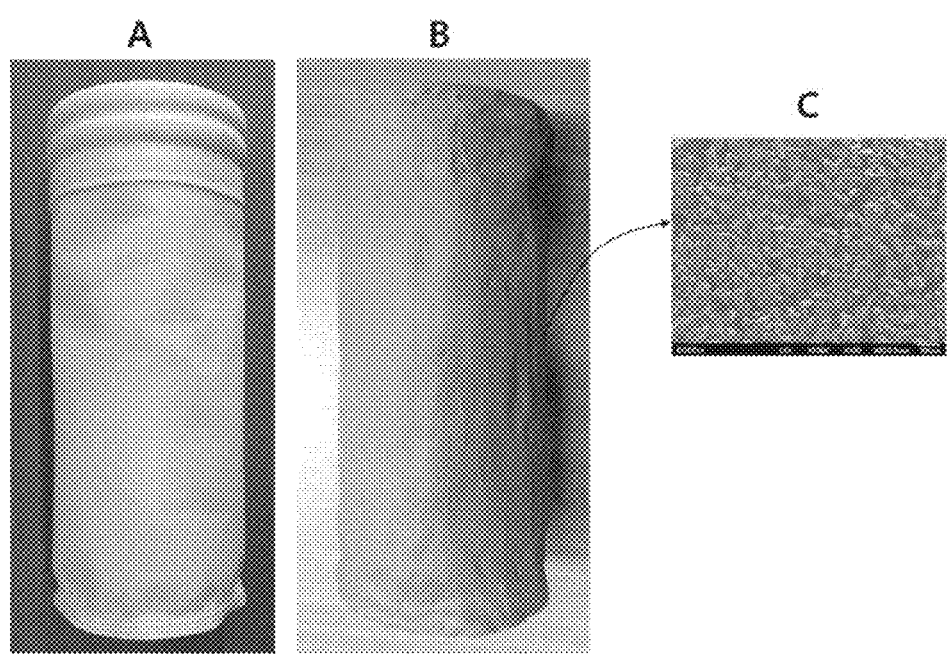
FIG. 2 shows the figure (A) of a polymer filter body used in manufacturing a ceramic filter, the figure (B) of the manufactured ceramic filter, and the morphology (C) of surface of the ceramic filter observed by a scanning electron microscope.

The results thereof are shown in FIG. 2.

In FIG. 2, (A) shows the figure of a polymer filter body used in manufacturing the ceramic filter of the present invention, (B) shows the figure of the manufactured ceramic filter, and (C) shows the results of observing the surface of the ceramic filter with a scanning electron microscope.

From FIG. 2, it was found that a uniform and compact ceramic layer was formed by the manufacturing method of the present invention.

Experimental Example 2: Evaluation of Performances of Ceramic Filter

In order to evaluate the performances of the ceramic filter of the present invention, the filtration efficiency (collection efficiency) of each of the ceramic filters manufactured in Examples 1 to 3 was measured.

In order to measure the filtration efficiency of each of the manufactured ceramic filters, each of the manufactured ceramic filters was mounted on a filter bag testing device, and fly ashes were generated as test particles. The speed of a fluid passing through the filter bag was fixed at 1 m/min, and then the number concentration of dust at the front and rear ends of the ceramic filter was measured by an aerodynamic particle sizer (Model: 3321, TSI Instruments), so as to measure the filtration efficiency thereof.

Figure 3:
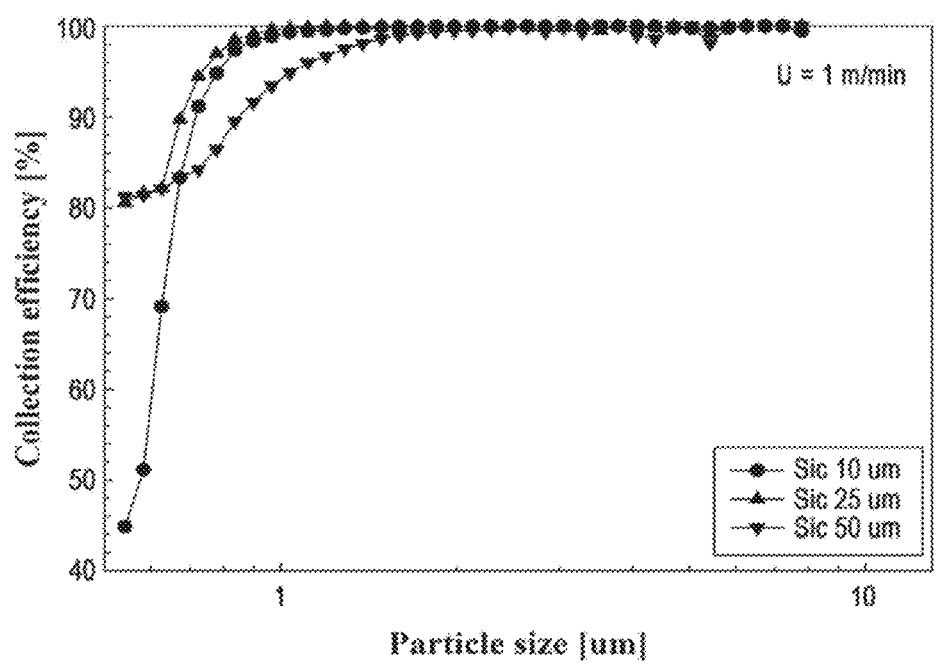
FIG. 3 is a graph showing the filtration efficiency of the ceramic filter according to the present invention.

The results thereof are shown in FIG. 3.

From FIG. 3, it was found that the ceramic filter manufactured using silicon carbide having a particle size of 10 μm to 50 μm could filter fine contaminants with a size of 1 μm or less at a rate of 90% or more.

What is claimed is:

1. A method of manufacturing a porous ceramic filter, comprising:

filtering a carrier gas including a ceramic-forming composition in the form of a powder on a surface of a polymer filter body having pores of a first size, the ceramic-forming composition containing ceramic precursor particles of a second size and inorganic and/or organic binder, to form a ceramic-forming composition layer on the surface of the polymer filter body (step 1); and sintering the resultant in step 1, to form a ceramic filter having a pore size of a third size formed by sintering the ceramic precursor particles of the second size, while burning out the polymer filter body (step 2)

wherein the second size is bigger than the first size.

2. The method according to claim 1, wherein step 1 is repeated at least 2 times using the ceramic precursor particles of the same size.

3. The method according to claim 1, wherein step 1 is repeated at least 2 times varying the size of ceramic precursor particles and/or the material of ceramic precursor particles.

4. The method according to claim 1, wherein the ceramic precursor particles are silicon carbide (SiC).

5. The method according to claim 1, wherein the inorganic and/or organic binder is mullite ($3Al_2O_3 \cdot SiO_2$), zirconia ($ZrO_2$), calcium carbonate ($CaCO_3$), carboxymethyl cellulose, or a combination thereof.

6. The method according to claim 1, wherein the ceramic-forming composition comprises silicon carbide (SiC), mullite ($3Al_2O_3 \cdot SiO_2$), zirconia ($ZrO_2$), calcium carbonate ($CaCO_3$), and carboxymethyl cellulose.

7. The method according to claim 6, wherein the ceramic-forming composition comprises silicon carbide, mullite, zirconia, calcium carbonate, carboxymethyl cellulose, and water at a weight ratio of 70~75:3~4:3~4:0.5~1.0:1~2:10~20.

8. The method according to claim 1, wherein the ceramic-forming composition further comprises water.

9. The method according to claim 1, wherein the size of ceramic precursor particles of the second size ranges from 5 μm to 100 μm.

10. The method according to claim 1, wherein the polymer filter body is made of polyester, polypropylene, acryl, polyamide, or polyimide.

11. The method according to claim 1, wherein the filtering step is performed at a rate of from 0.5 m/min to 10 m/min.

12. The method according to claim 1, wherein ceramic-forming composition layer has a thickness of from 1 mm to 10 mm.

13. The method according to claim 1, wherein the sintering is performed at a temperature of from 1400° C. to 1500° C.

14. The method according to claim 1, wherein a heating rate in step 2 of sintering ranges from 3° C./min to 4° C./min.

15. The method according to claim 1, wherein the sintering is performed for from 1 hour to 5 hours.

* * * * *